United States Patent [19]

Suzuki et al.

[11] Patent Number: 4,791,528
[45] Date of Patent: Dec. 13, 1988

[54] POWER SUPPLY DEVICE

[75] Inventors: Koji Suzuki; Shunichi Komatsu, both of Yokohama, Japan

[73] Assignee: Canon Kabushiki Kaisha, Tokyo, Japan

[21] Appl. No.: 170,661

[22] Filed: Mar. 7, 1988

Related U.S. Application Data

[63] Continuation of Ser. No. 872,512, Jun. 10, 1986, abandoned.

[30] Foreign Application Priority Data

Jun. 13, 1985 [JP] Japan ................... 60-127191
Jun. 13, 1985 [JP] Japan ................... 60-127192
Jun. 13, 1985 [JP] Japan ................... 60-127193

[51] Int. Cl.$^4$ ............................................ H02M 3/34
[52] U.S. Cl. ..................................... 361/235; 355/69; 363/21; 363/97
[58] Field of Search ............... 363/20, 21, 97; 355/69; 361/23 D, 235; 250/324–326

[56] References Cited

U.S. PATENT DOCUMENTS 4,037,271 7/1977 Keller ................................. 363/21
4,477,179 10/1984 Inuzuka et al. ................. 355/69 X
4,517,633 5/1985 Melcher ............................. 363/21

Primary Examiner—L. T. Hix
Assistant Examiner—D. Rutledge
Attorney, Agent, or Firm—Fitzpatrick, Cella, Harper & Scinto

[57] ABSTRACT

There is disclosed an integral power supply device for supplying a high voltage and a low voltage in stable manner. A switched input voltage is supplied to a self-excited transformer having two secondary output voltages. A high voltage output is supplied to a first load and is controlled by a control circuit which receives a low voltage output supplied also to a second load.

15 Claims, 4 Drawing Sheets

POWER SUPPLY DEVICE

This application is a continuation of application Ser. No. 872,512 filed June 10, 1986, now abandoned.

BACKGROUND OF THE INVENTION

The present invention relates to a power supply device, and in particular to a power supply device capable of supplying high and low voltages.

Certain apparatus such as copying machine or laser beam printer require a high voltage supply for example for a charger, and a low voltage supply for control unit such as a microprocessor for controlling the operation sequency of the apparatus.

In such apparatus it has been customary to convert the commercial power supply to a low voltage of the order of 24V, to stabilize the low voltage, and to guide the voltage to a high voltage power supply device for voltage elevation and rectification.

Instead of an integral power supply unit for high and low voltages as in television receivers, the above-explained structure is adopted in order to control the high voltage supply by a control unit operated by a low voltage supply, to simplify the structure of the high voltage supply unit, and to meet the conditions of insulation required by various standards.

However the above-explained structure requires plural separate power supply units, and is therefore complex and expensive. It is thus difficult to reduce the cost, dimension and weight of the power supply. Also such a structure is undesirable in terms of power efficiency, particularly on the high voltage side. Such drawback is not limited to copying machines but exists commonly in any apparatus that requires high and low voltages and has to control the high voltage supply.

The control of the high voltage supply is indispensable since continuous high voltage supply is not only undesirable in terms of power consumption but also leads to the deterioration of the charger, the photosensitive drum etc., in case of a copy machine.

SUMMARY OF THE INVENTION

In consideration of the foregoing, an object of the present invention is to provide an improved power supply device.

Another object of the present invention is to provide a power supply device which is simple in structure and reduced in cost.

Still another object of the present invention is to provide a power supply device which can be rendered compact in dimension and light in weight.

Still another object of the present invention is to provide power supply device which is highly reliable and has a low failure rate.

The foregoing and still other objects of the present invention will become fully apparent from the following description to be taken in conjunction with the attached drawings.

DETAILED DESCRIPTION OF THE PREFERRED EMBODIMENTS

Now the present invention will be clarified a detailed description of the embodiments thereof, in which the present invention is applied to a copying machine.

Figure 1:
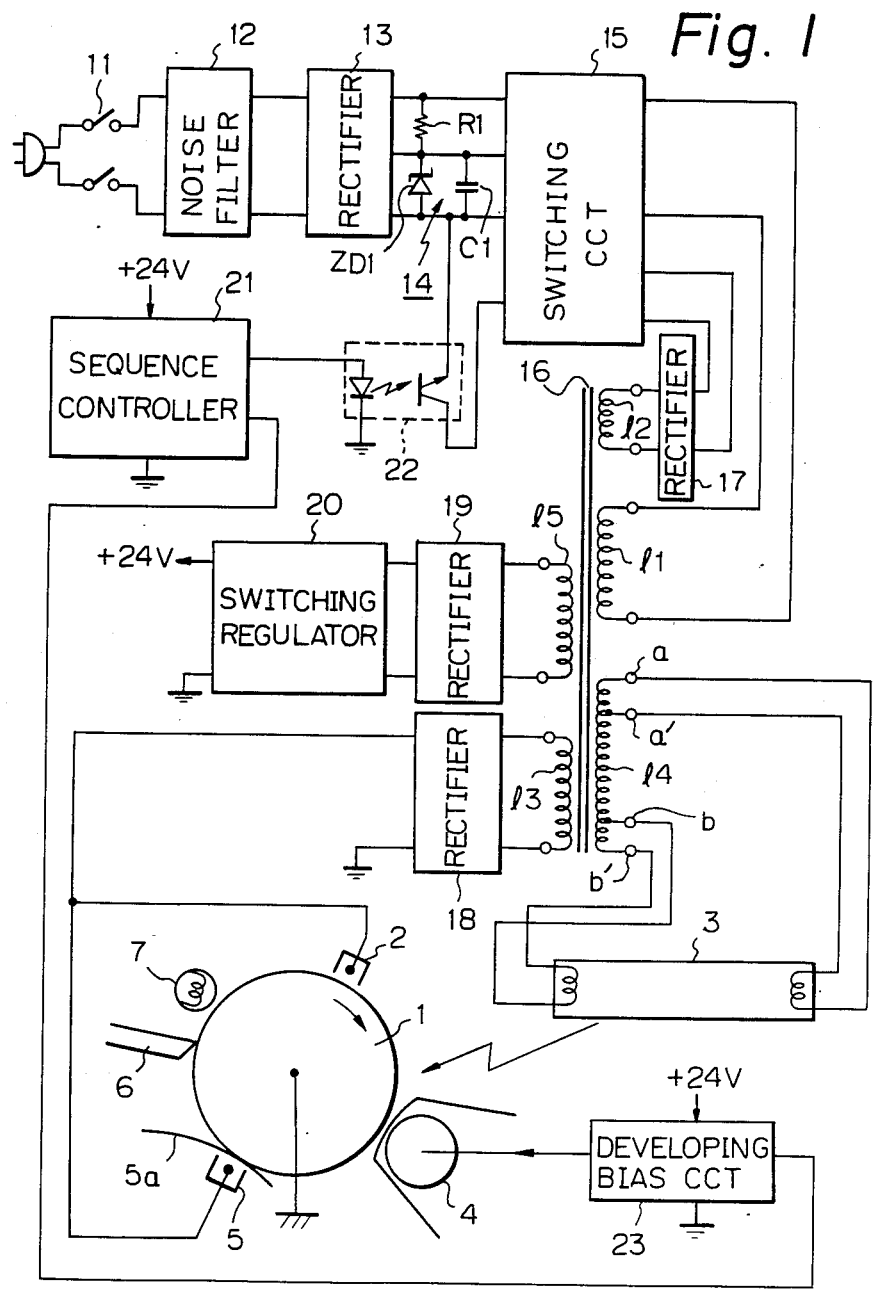
FIG. 1 is a block diagram of a copying machine embodying the present invention.

FIG. 1 shows a power supply system of a copying machine. The diagram is principally limited to a DC power supply system, and omitted is an AC power supply system for driving motors for an optical system, an original carriage etc. and fixing motor. The electric power to the AC power supply system is supplied through a main power switch 11 and a noise filter 12, and the AC power supply system is controlled, through relays and semiconductor switches, by a sequence controller 21.

In the lower part of FIG. 1 there is schematically shown an image forming system. Around a photosensitive drum 1 having a CdS or other photosensitive member, there are provided already known means for image formation. The surface of the photosensitive drum 1 is charged by a primary charger 2, and is then exposed to the light reflected by an original illuminated by an exposure lamp 3, thereby forming an electrostatic latent image on said surface. The latent image is subjected to toner development by a developing roller 4, according to various developing methods. The bias of said developing roller 4 is controlled by a sequence controller 21 through a developing bias circuit 23.

Subsequently the toner image is transferred onto a sheet of paper 5a by means of a transfer charger 5. The toner remaining on the photosensitive drum 1 is scraped off by a cleaning blade 6, and the drum surface returns to the position of the primary charger 2 after charge elimination by a cleaning lamp 7.

In the present embodiment, all the electric power for DC system is supplied from a single converter transformer 16. The high-frequency electric power to the exposure lamp 3 is supplied from a coil 14 of the converter transformer 16. The exposure lamp 3 is composed of a fluorescent lamp, of which filaments at both ends are respectively connected to taps a, a' and b, b' of the coil 14.

The high-voltage electric power to the charger is supplied from a rectifier 18 connected to a coil 13, while a low-voltage (24V) electric power to the sequence controller 21 and the developing bias circuit 23 is supplied from a constant-voltage power supply unit composed of a rectifier 19 and a switching regulator 20 connected to a coil 15.

The high voltage is controlled by the sequence controller 21 which controls a switching circuit 15 through an insulating photocoupler 22. The switching circuit 15 receives the output of the noise filter 12 after rectification by a rectifier 13. Between the rectifier 13 and the switching circuit 15 there is inserted an auxiliary power supply circuit 14 composed of a Zener diode ZD1, a resistor R1 and a capacitor C1. This auxiliary circuit generates, from the output of the rectifier 13, a power in the order of 24V and 10–20 mA and supplies the same to the switching circuit 15.

Figure 2:
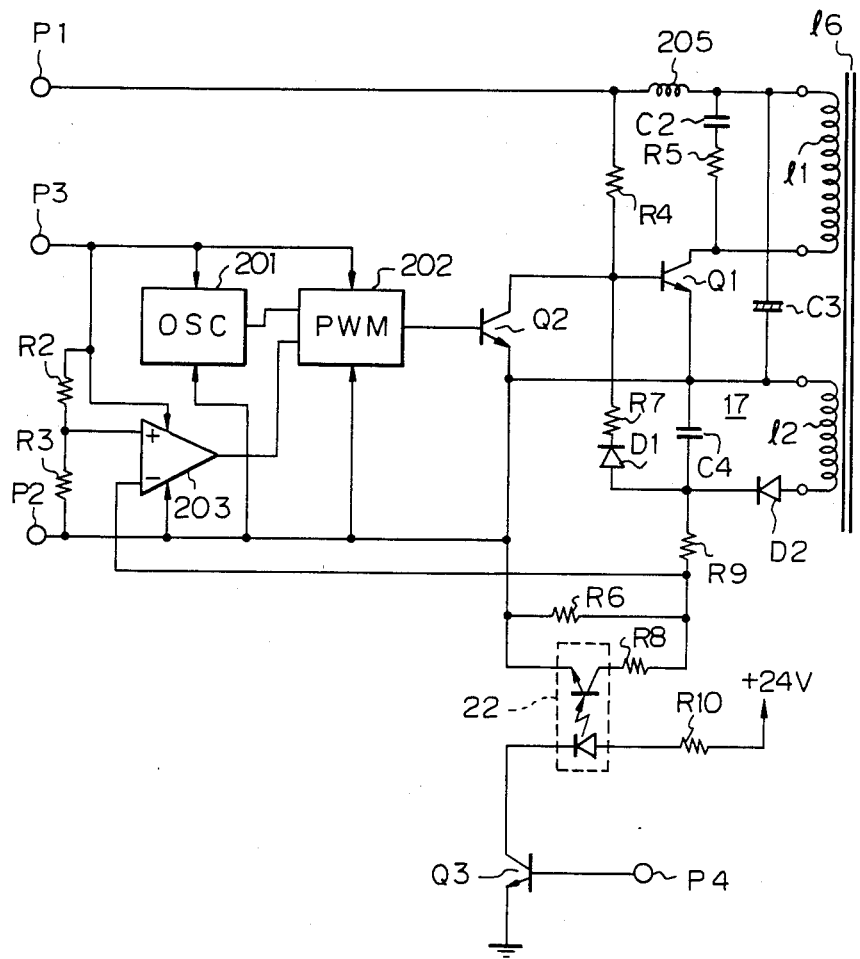
FIG. 2 is a circuit diagram of a switching circuit shown in FIG. 1.

The switching circuit 15 for exciting the primary coil of the converter transformer 16 is composed as shown in FIG. 2. Terminals P1, P2 receive the rectified output from the rectifier 13. The constant voltage output of the auxiliary power supply circuit 14 is received by a terminal P3 to drive an oscillator 201, a pulse width modulation (PWM) circuit 202 and a differential amplifier 203. Also the rectifier 17 shown in FIG. 1 is composed of diodes D1, D2, a resistor F7 and a capacitor C4. The negative side of the coil 12 is connected to a common potential in the circuit shown in FIG. 2.

The oscillator 201 generates a sawtooth wave for comparison, whereby the PWM circuit 202 generates a square wave for turning on and off a transistor Q2 for controlling the base of a coil-exciting transistor Q1. The transistor Q1 turns on and off the current in a coil 11 receiving the input from the terminal P1 at an end. To the coil 11 there are connected a resonance choke coil 205, capacitors C2, C3 and a resistor R5.

The duty ratio of the square wave released by the PWM circuit 202 is determined by the differential amplifier 203 for releasing a constant output. The differential amplifier 203 controls the PWM circuit 202 in such a manner that a voltage obtained by dividing the output of the coil 12 with resistors R9, R6 becomes equal to a reference voltage obtained by dividing the voltage across the terminals P3, P2 with resistors R2, R3.

A resistor R8 and a photocoupler 22 are connected parallel to the resistor R6 for dividing the output of the coil 12. The photocoupler 22 is controlled by the input to a terminal P4, through a driving circuit composed of a resistor R10 and a transistor Q3. The terminal P4 receives a control signal of the sequence controller 21.

The function of the above-explained circuit will now be explained.

When the converter transformer 16 is not yet excited immediately after the start of power supply, the base current of the transistor Q1 is supplied through the resistor R4. When the transformer reaches a stable excited state through the procedure to be explained below, the base current to the transistor Q1 is supplied by the rectified output of the coil 12.

The PWM circuit 202 generates a square wave through the comparison of the outputs of the oscillator 21 and the differential amplifier 201, thus turning on and off the transistor Q2. When the transistor Q2 is turned on, the current supplied to the base of the transistor Q1 flows between the collector and emitter of the transistor Q2, whereby the transistor Q1 is turned off. In this state, in order to improve the cut-off characteristic of the transistor Q1, the transistor Q2 is rendered conductive at a high speed and with a low impedance, thereby generating an inverse current from the emitter to the base of the transistor Q1, thus dissipating a small amount of carriers accumulated in the base of the transistor Q1.

As explained in the foregoing the duty ratio of the output pulses of the PWM circuit 202 is controlled according to the output of the coil, so that the converter transformer 16 is so controlled, through the transistors Q1, Q2 as to provide a constant output. Thus the voltages elevated according to the ratio of number of turns of the coils are supplied to the charger, exposure lamp, sequence controller 21 etc.

When the sequence controller 21 turns on the light-emitting diode of the photocoupler 22, a current is generated in the photodiode thereof whereby the resistor R8 is connected parallel to the resistor R6. The resistance of the resistor R8 is so selected that the voltage divided by the resistors R9, R6 is reduced to $\frac{1}{2}$-$\frac{1}{4}$. When the resistor R8 is connected, the output of the coil 12, and all other outputs of the converter transformer 16 are elevated 2 to 4 times, since the differential amplifier 203 so functions as to bring two input voltages equal. In the following explanation it is assumed that the ratio of elevation is 3 times.

Figure 3:
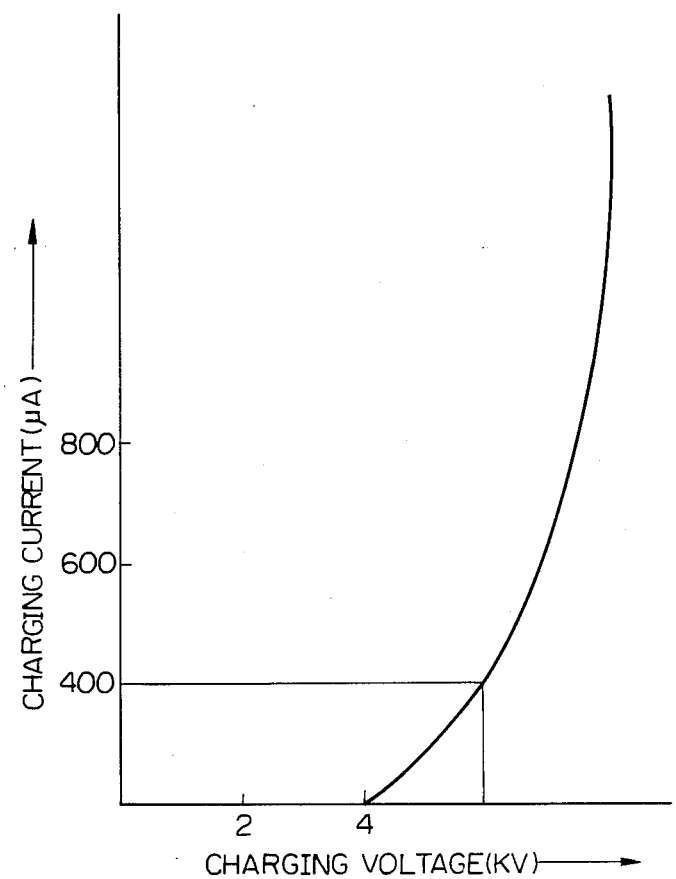
FIG. 3 is a chart showing the characteristic of a charger shown in FIG. 1.

The coil 13, supplying high voltages to the chargers 2, 5, is so designed as to provide a voltage of $-6$ kV at the image formation where the photocoupler 22 is turned on, and $-2$ kV in the stand-by state when the photocoupler is turned off. In general the charger has the voltage-current characteristic as shown in FIG. 3, so that practically no charging current flows at an absolute voltage not exceeding 4 kV under normal atmospheric pressure. Also no charging current is obtained at 2 kV even under a lowest practical pressure condition. Consequently no deterioration occurs in the charger of photosensitive drum in such a voltage range.

The coil 14 generates a peak-to-peak voltage of 200 to 300V at the image formation, thus driving the filaments at the ends of the fluorescent lamp through the taps a, a', b, b'.

The power to the sequence controller 21 is stabilized by the switching regulator 20. Thus the sequence controller 21 and related circuits receive a voltage of 24V even when the output of the converter transformer varies. The number of turns of the coil 15 is so selected that the rectified output of the rectifier 19 becomes equal to 81V or 27V, respectively, when the photocoupler 22 is turned on or off.

As explained in the foregoing, it is rendered possible to employ a single transformer for the high voltage supply and low voltage supply, thereby reducing the dimension of the power supply device. In addition the transformer driving circuit can be used in common, so that the volume of the power supply device can be reduced to $\frac{2}{3}$ to $\frac{1}{2}$, and such reduction contributes to the compactness of the entire apparatus.

Also the cost of the power supply device can be reduced since the number of relatively expensive transformers is reduced. Furthermore it is rendered possible to improve the reliability and facilitate the maintenance through the reduction in the number of components and wirings.

In the foregoing embodiment the low voltage is supplied from the switching regulator 20, but such switching regulator is often complex and expensive. An embodiment shown in FIG. 4 allows one to simplify the low voltage supply for control.

Figure 4:
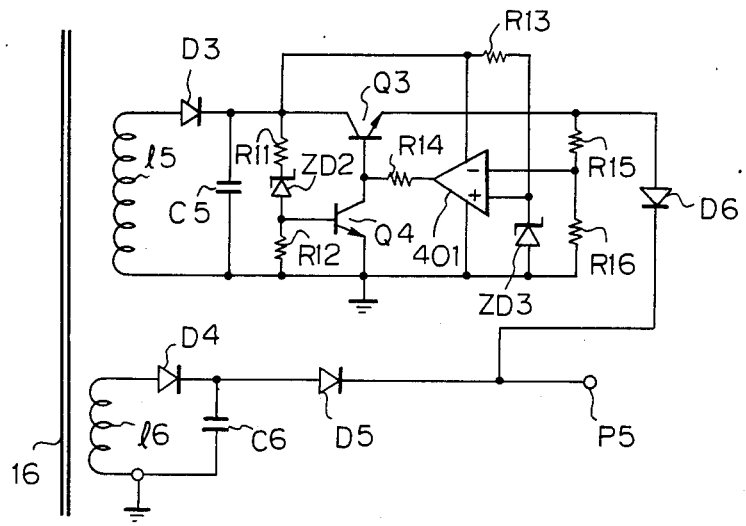
FIGS. 4 and 5 are circuit diagrams showing different embodiments of a low voltage supply device for control.

In FIG. 4, the converter transformer 16 is provided with an additional coil 16, and the coils 15, 16 of different numbers of turns are selectively utilized according to the change in the output. The output of the coil 15, rectified and smoothed by a diode D3 and a capacitor C5 is supplied, through the collector and emitter of a transistor Q3 and a diode D6 and through a terminal P5, to the control circuit. On the other hand, the output of the coil 16, of a smaller ratio of number of turns than that of the coil 15, is rectified and smoothed by a diode D4 and a capacitor C6 and released through a diode D5 to the terminal P5.

The output voltage of the coil 15 is divided, in front of the diode D6, by resistors R15, R16 and is introduced to the negative input terminal of a differential amplifier 401, of which the positive input terminal is grounded through a Zener diode ZD3 and receives the rectified and smoothed output of the coil 15 through a resistor R13. The output of the differential amplifier 401 is supplied to a junction between the collector of an emitter-grounded transistor Q4 and the base of a transistor Q3. The base of said transistor Q4 is connected to a resistor R12 and a serial circuit of a Zener diode ZD2 and a resistor R11 which divide the output of the coil 15.

In the above-explained circuit, when the converter transformer 16 does not release a high voltage in a stand-by state, the synthesized output at the terminal P5 becomes equal to the voltage of the coil 15 having a larger ratio of number of turns. The output of the coil 15 is compared, by the differential amplifier, with the voltage of the Zener diode Zd3, and the transistor Q3 is accordingly controlled to stabilize the output.

When the converter transformer 16 starts to generate high voltages through the above-explained operation, the terminal voltage of the Zener diode ZD2 exceeds the Zener voltage, whereby the transistor Q4 is turned on to turn off the transistor Q3. Consequently the output of the coil 15 is shut off, so that the output of the coil 16 is supplied to the control device through the terminal P5. The ratio of the numbers of turns of the coils 15, 16 can be determined according to the aforementioned ratio of output control.

Figure 5:
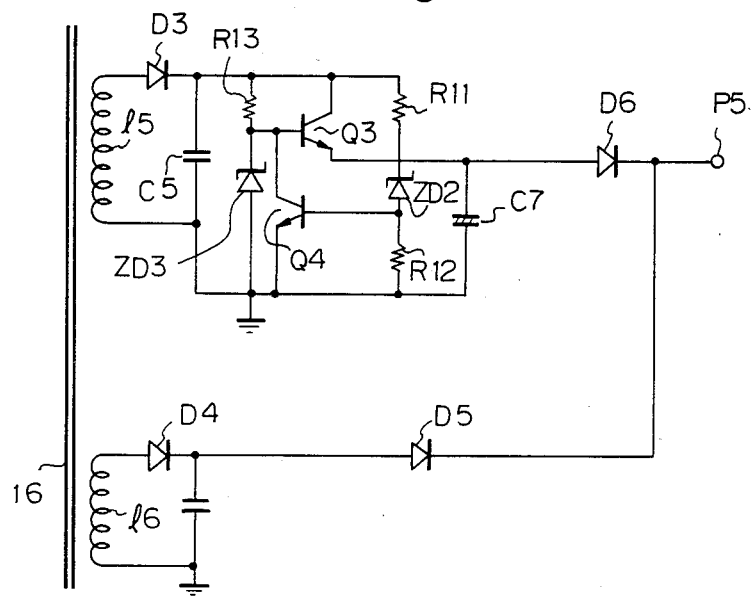

FIG. 5 shows a further simplified structure of the low-voltage power supply for the control device.

In the embodiment shown in FIG. 5, in a low-output stand-by state, the output at the terminal P5 is obtained from a transistor Q3. The output of the transistor Q3 is stabilized by a Zener diode ZD3 connected to the base thereof. When the output increases, the terminal voltage of the Zener diode ZD2 exceeds the Zener voltage, whereby a transistor Q4 is turned on to turn off transistor Q3 and the output of the coil 16 is supplied through the terminal P5.

As explained in the foregoing, it is rendered possible to provide a low-voltage power supply for control without employing a complex and expensive switching regulator, by providing the transformer with two coils and utilizing one of the two coils for detecting and controlling the output of the converter transformer.

We claim:

1. A power supply device comprising:
   a transformer having a primary winding and a plurality of secondary windings comprising first and second secondary windings;
   switching means connected to said primary winding of said transformer for switching an input to said primary winding to generate an increased voltage output on said plurality of secondary windings of said transformer;
   first output means for applying a high voltage to a predetermined load in accordance with an output of said first secondary winding;
   second output means connected to said second secondary winding for outputting a predetermined low voltage;
   control means adapted to be supplied thereto with said predetermined low voltage from said second output means as an operation source, said control means producing a control signal for switching the high voltage supplied to said predetermined load from a first high voltage to a second high voltage; and
   change means responsive to said control signal for changing the electric power supplied to said primary winding.

2. A power supply device according to claim 1, wherein said second output means comprises rectifying means for rectifying the low-voltage output of said transformer and stabilizing means for stabilizing the output of said rectifying means to a constant low-voltage, wherein the output of said stabilizing means is supplied to said control means.

3. A power supply device according to claim 2, wherein sid stabilizing means comprises a switching regulator.

4. A power supply device according to claim 1, wherein said switching means comprises:
   an auxiliary power supply formed from a part of input;
   comparator means for comparing the output of the transformer with a pre-determined value for maintaining the output of the transformer constant;
   signal output means for releasing a signal of varying duty ratio according to the output of said comparator means; and
   a transistor for effecting a switching operation according to the output signal of said signal output means.

5. A power supply device according to claim 4, wherein said plurality of secondary windings include a third secondary winding, wherein the driving current for said transistor is supplied by a rectified output of the input power at the start of operation, and by said third secondary winding of said transformer after the operation is started.

6. A power supply device according to claim 1, wherein said pre-determined load is a charger of an image forming apparatus.

7. A power supply device according to claim 6, wherein said first high voltage is adapted to prevent charge current from flowing through said charger, and said second high voltage is adapted to permit charge current to flow through said charger.

8. A power supply device according to claim 7, wherein said first high voltage is applied to said charger at a time during which said image forming apparatus is in its stand-by state, and said second high voltage is applied to said charger at the time of image formation of said image forming apparatus.

9. A power supply device for image forming apparatus comprising:
   a transformer having a primary winding and a plurality of secondary windings including first and second secondary windings;
   switching means connected to said primary winding of said transformer for switching an input to said primary winding to generate an increased output voltage on said plurality of secondary windings of said transformer;
   first output means for outputting a high voltage to a charging means in accordance with an output of said first secondary winding;
   second output means for outputting a high frequency output to an exposure means in accordance with an output of said second secondary winding;
   third output means connected to said second secondary winding for outputting a regulated low voltage to a sequence control means; and
   change means responsive to a control signal from said sequence control means for changing the output voltage from said first output means between the time during which the image forming apparatus is in its stand-by state and the time of image formation of the image forming apparatus.

10. A power supply device according to claim 9, wherein said change means changes the output voltage from said first output means so as to provide, at the time during which the image forming apparatus is in its stand-by state, a voltage which is adapted not to flow charge current through said charging means; and so as to provide, at the time of image formation, a voltage which is adapted to flow charge current through said charging means.

11. A power supply device according to claim 9, wherein said change means is operable to more than double the output voltage of said first secondary winding.

12. A power supply device comprising:
a transformer having a primary winding and a plurality of secondary windings including first, second, and third secondary windings;
switching means connected to said primary winding of said transformer for switching an input to said primary winding to generate an increased output voltage on said plurality of secondary windings of said transformer;
first output means for applying a high voltage to a pre-determined load in accordance with an output of said first secondary winding;
second output means for outputting a low voltage from said second secondary winding;
third output means for outputting a low voltage from said third secondary winding;
selection means for selecting the output of said second output means or said third output means; and
control means adapted to be supplied with said low voltage from said second or third output means selected by said selection means as an operation source, said control means producing a control signal for controlling the high voltage outputted from said first output means.

13. A power supply device according to claim 12, wherein said predetermined load is a charger of an image forming apparatus, and said control means produces the control signal for changing over the high voltage applied from said first output means to said charger between the time during which the image forming apparatus is in its stand-by state and the time of image formation of the image forming apparatus.

14. A power supply device according to claim 13, wherein said first output means outputs, at the time during which the image forming apparatus is in its stand-by state, the voltage which is adapted to prevent charge current from flowing through said charger, and outputs, at the time of image formation, a voltage which is adapted to permit charge current to flow through said charger.

15. A power supply device according to claim 13, wherein said selection means is operable, at the time during which the image forming apparatus is in its stand-by state, to apply the low voltage from said second output means to said control means, and at the time of image formation, to apply the low voltage from said third output means to said control means.

* * * * *